May 17, 1949.                P. C. McLEAN                2,470,359
                              HOSE COUPLING
                           Filed Feb. 21, 1946
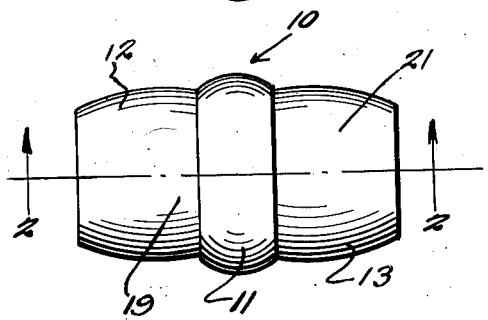
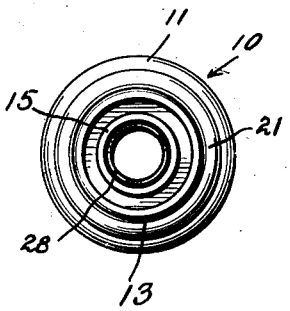
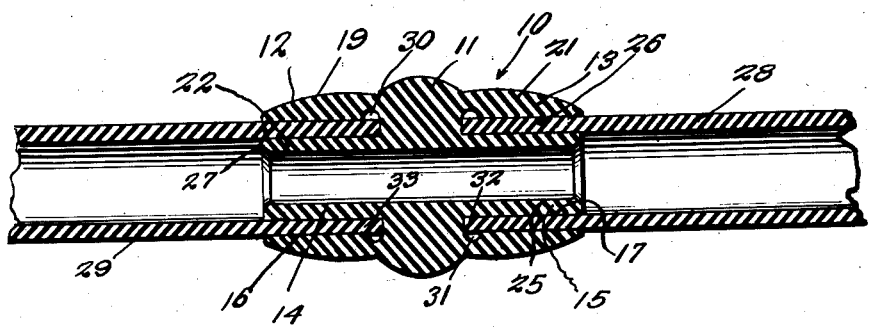
Inventor
PAUL C. McLEAN
By Clarence A. O'Brien
and Harvey B. Jacobson
Attorneys Patented May 17, 1949

2,470,359

UNITED STATES PATENT OFFICE 2,470,359

HOSE COUPLING

Paul C. McLean, Hollywood, Calif.

Application February 21, 1946, Serial No. 649,271

2 Claims. (Cl. 285—90)

The invention as described herein, and illustrated in the accompanying drawings, consists of a hose coupling and repair device, an object of which is to provide an expansible and contractable connection for hose-ends.

Another object of the invention is to provide a hose coupling formed of one piece and requiring no clamp or other attaching element.

Another object of the invention is to provide an expansible hose coupling.

A still further object of the invention is the provision of means whereby the ends of hose sections may be held together entirely through friction.

A primary object of the invention is the provision of means whereby a pair of hose ends may be connected by a rubber coupling which through pressure of water passing therethrough will be expanded to more securely seal the connection.

Other features and advantages will become more readily apparent from the following description and the accompanying illustrative drawings in which:

Figure 1 is an elevational view of the coupling,

Figure 2 is a sectional view taken on line 2—2 of Figure 1,

Figure 3 is an end view of Figure 1.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention and 11 indicates the body portion or center wall of a flexible tubular rubber coupling from the outer sides of which extend tubular ends 12 and 13 and inwardly of which projects from each side tubular extensions 14 and 15, and into the annular bores 16 and 17 formed between the walls 19 and 21 and the inner walls 22 and 25, the terminals 26 and 27 of the hose ends 28 and 29 are adapted to be forced and which will be frictionally engaged by the said walls surrounding said bores 16 and 17. The said bores 16 and 17 terminate inwardly in enlarged annular grooves 30 and 31 into which the extreme terminals 32 and 33 of said hose ends will be forced through water pressure passing through the said hose and coupling whereby it will be impossible for the coupling and hose ends to become separated no matter how great the water pressure passing therethrough may be. The flexibility of the coupling together with that of the hose will create a binding frictional engagement between the said members even regardless of the said enlarged grooves.

From the above description it will appear that I have provided a repair coupling for a garden or other hose which may be very quickly attached to the ends of the hose and which will require no other means than the flexibility of the coupling to secure said ends. In case of a break at any point in a hose it will only be necessary to cut the hose in two at the point of break and then connect the two ends thereof by the repair coupling.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention, that which is claimed to be new and desired to be procured by Letters Patent is:

1. A unitary coupling comprising a flexible tube having an outer tubular flange and an inner tubular flange at each end of said tube, all said flanges being coaxial with the tube, whereby two grooves are defined between adjacent flanges for the insertion thereinto of ends of tubular members, said outer flanges having annular internal recesses to allow sealing expansion of adjacent portions of said tubular members when pressure is applied thereon, the outer flanges having reduced external diameters at the outer ends thereof, and the inner flanges having increased internal diameters at the outer ends thereof.

2. A coupling according to claim 1 and in which said recesses are located at the roots of said grooves.

PAUL C. McLEAN.

REFERENCES CITED

The following references are of record in the file of this patent:

UNITED STATES PATENTS

| Number | Name | Date |
|---|---|---|
| 750,444 | Fischer | Jan. 26, 1904 |
| 1,463,360 | Foote | July 31, 1923 |
| 1,558,503 | Pressler | Oct. 27, 1925 |
| 2,004,122 | Loibl | June 11, 1935 |
| 2,039,009 | Lampman et al. | Apr. 28, 1936 |
| 2,214,261 | Roth | Sept. 10, 1940 |
| 2,219,945 | Scott | Oct. 29, 1940 |
| 2,225,472 | Franklin | Dec. 17, 1940 |